United States Patent [19]

Cole et al.

[11] 4,049,168

[45] Sept. 20, 1977

[54] TENSION EQUALIZER

[75] Inventors: Leon J. Cole, Lima, Ohio; John R. Tolan, South Bend, Ind.

[73] Assignee: Milliken Research Corporation, Spartanburg, S.C.

[21] Appl. No.: 754,763

[22] Filed: Dec. 27, 1976

Related U.S. Application Data

[63] Continuation of Ser. No. 616,156, Sept. 24, 1975, abandoned.

[51] Int. Cl.$^2$ ............................ B65H 59/38; B65H 77/00
[52] U.S. Cl. ................................... 226/40; 226/44; 226/109; 226/111
[58] Field of Search .................. 226/109, 108, 111, 25, 226/40, 42, 44, 36; 57/91

[56] References Cited

U.S. PATENT DOCUMENTS

| | | | |
|---|---|---|---|
| 1,791,450 | 2/1931 | Kellogg | 226/109 X |
| 3,385,489 | 5/1968 | Schreck et al. | 226/42 X |
| 3,707,252 | 12/1972 | Kasecky et al. | 226/25 |
| 3,768,715 | 10/1973 | Tout | 226/40 |

*Primary Examiner*—Bruce H. Stoner, Jr.
*Attorney, Agent, or Firm*—H. William Petry; Robert S. Alexander

[57] ABSTRACT

Apparatus for coordinating the transfer of two continuous cords or strips includes a first roll for delivering a first cord or strip, a second roll for delivering a second cord or strip, a drive for the first roll, a drive capable of operating the second roll at speeds different from that of the first roll, and a tension-detecting control arrangement for detecting changes in the tension of the cord or strip being delivered by the first roll and changing the speed of the second roll in response thereto.

3 Claims, 4 Drawing Figures

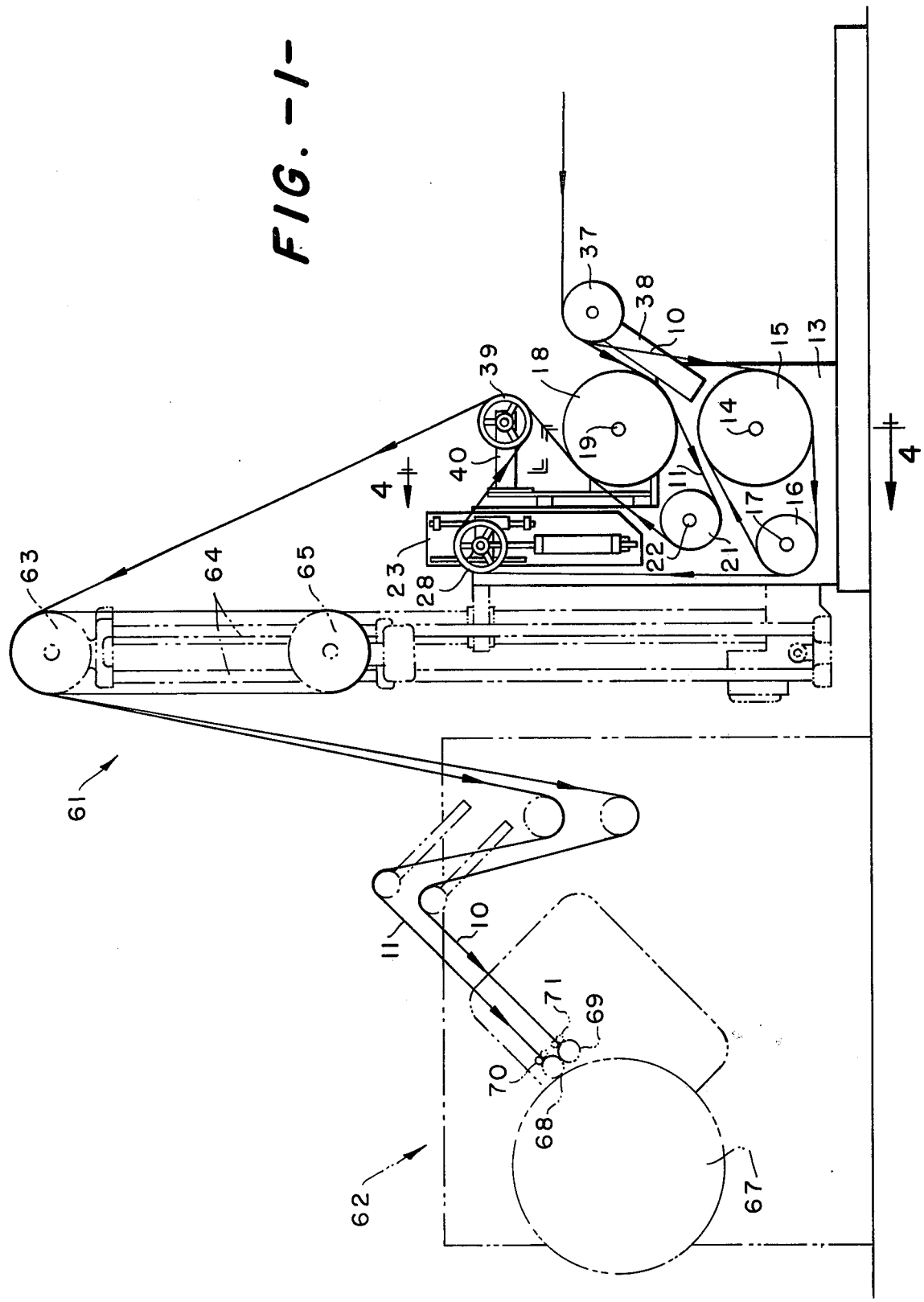

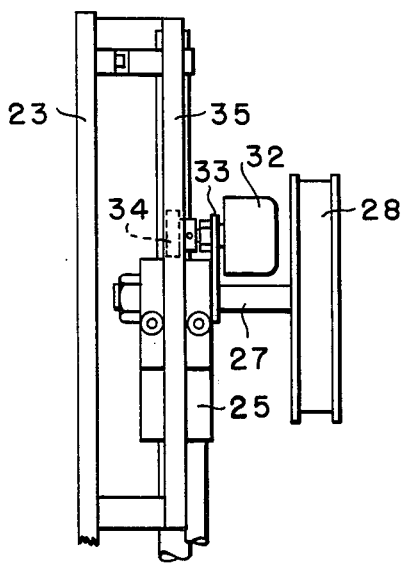
FIG.-3-
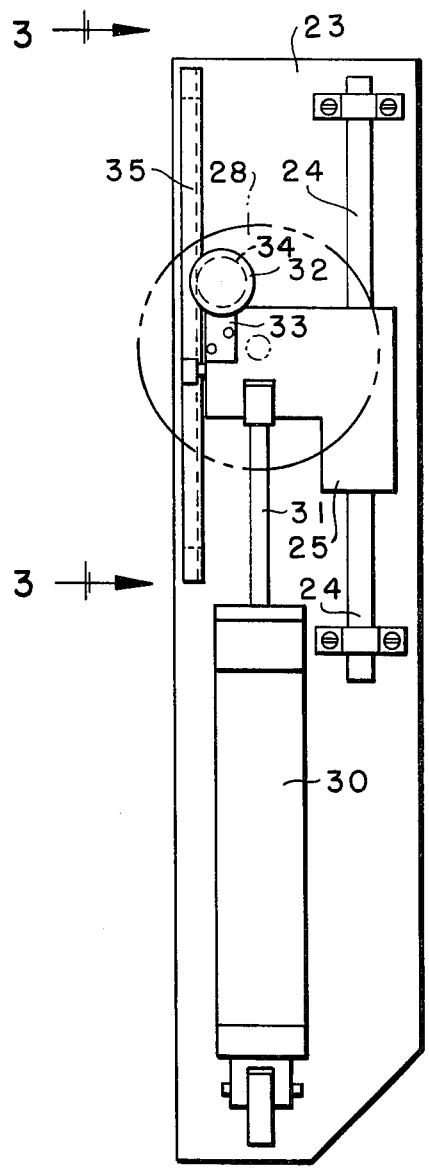
FIG.-2-

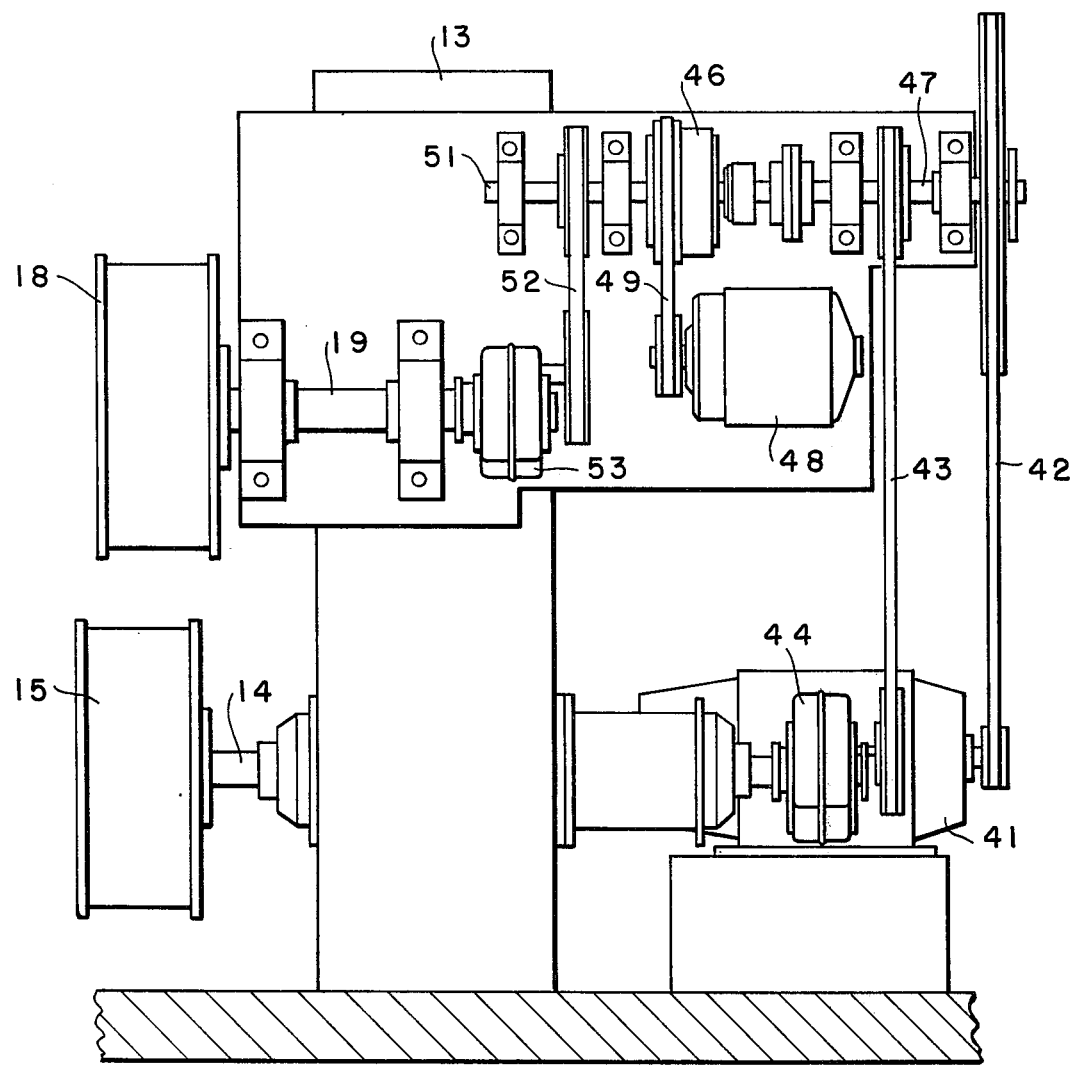
FIG.-4-

TENSION EQUALIZER

This is a continuation of application Ser. No. 616,156, filed Sept. 24, 1975, now abandoned. This invention relates to an apparatus for controlling the transer of continuous cords or strips and more particularly relates to an apparatus for coordinating the tension of two or more continuous cords or strips being advanced to a storage apparatus.

It has been proposed to employ continuous cords or strips in the manufacture of tread reinforcing belts for use in belted tires. Such belts may be formed by winding the cords or strips onto a rotating drum in a generally zigzag pattern employing reciprocating guides to position the cords or strips. Examples of such procedures are disclosed in U.S. Pat. Nos. 2,982,327; 3,720,569; 3,720,570; 3,748,203 and 3,761,341.

One of the problems in producing a commercially successful tire belt is maintaining the configuration and dimensions of the belt within close tolerances. To insure a uniform pattern, it is important that the tension in the cords or strips be maintained substantially constant during the winding operation.

The present invention provides a novel apparatus for transferring two or more cords or strips under substantially equal tensions. Furthermore, the apparatus of the invention provides for the detection of changes in tension between the cords or strips and the adjustment of the respective transfer speeds to provide substantially equal tensions. Moreover, the apparatus of the invention is capable of coordinating the tension of several cords or strips while they are being transferred at relatively high rates of speed over extended operating periods. Other advantages and benefits of the invention will be apparent from the following detailed discussion and description of the drawings in which:

FIG. 1 is a schematic front elevation of one form of apparatus of the invention for controlling cord or strip tension;

FIG. 2 is an enlarged view showing the tension controlling portion of the apparatus of FIG. 1;

FIG. 3 is a fragmentary view taken along line 3—3 of FIG. 2; and

FIG. 4 is an enlarged view taken along line 4—4 of FIG. 1;

As shown in the drawings, one form of apparatus for coordinating tension in cords or strips being continuously transferred includes a frame 13 having a shaft 14 extending therefrom on which is mounted a rotatable pull drum 15. Adjacent the drum 15 is positioned a roll 16 mounted on a slightly canted shaft 17 extending from frame 13.

Disposed above the drum 15 is another pull drum 18 mounted on a shaft 19 extending from frame 13. Adjacent to drum 18 is positioned a roll 21 mounted on a slightly canted shaft 22. A plate 23 is mounted on frame 13 above the rolls 16 and 21. Attached to plate 23 is a slide rod 24 on which is slidably mounted a block 25. Shaft 27 extending from block 25 has disposed thereon a rotatable sheave 28. A cylinder 30 is secured to plate 23 below block 25 with a piston rod 31 extending toward block 25 and affixed thereto. A potentiometer 32 is attached to block 25 by a bracket 33. A spur gear 34 is secured to the shaft of the potentiometer 32 for engagement with a guide-rack 35 secured to plate 23. Guide-rack 35 is positioned parallel to rod 24 on which block 25 moves.

Adjacent to drums 15 and 18 are located two guide rolls 37 only one of which is visible, rotatably mounted on arm 38 extending from frame 13. Also, two sheaves 39 only one of which is visible are, rotatably mounted on an arm 40 extending from the frame 13 adjacent to sheave 28.

As shown in FIG. 4, drums 15 and 18 are driven by a motor 41 through appropriate pulleys and belts. Belt 43 which is driven by belt 42 through shaft 47 is attached to speed reducer 44 which is connected to shaft 14 of drum 15. Drum 18 is driven by belts 42 and 52 through shafts 47, 51 and 19. The speed of drum 18 with respect to that of drum 15 may be altered by means of a planetary differential 46 mounted on shafts 47 and 51 which is driven by belt 42. The exterior case of planetary differential 46 is driven by a separate motor 48 through a belt 49. The exterior case velocity either adds to or substracts from the output speed of the planetary differential. The amount of the increase or decrease will depend upon the speed of motor 48. The output shaft 51 of planetary differential 46 drives shaft 19 on which drum 18 is mounted through a belt and pulley arrangement 52 and a speed reducer 53.

The apparatus of the invention may be employed in combination with a storage apparatus 61 and/or winding apparatus 62 as shown in FIG. 1. The storage apparatus 61 includes a plurality of sheaves 63 positioned at the top of guide rods 64. A plurality of sheaves 65 are positioned for movement along guide rods 64. Winding apparatus 62 includes a rotatable drum 67, a press roll 68, a transfer roll 69 and guide heads 70 and 71.

In the operation of the apparatus of the invention as shown in the drawings, cords or strips 10 and 11 from an extruder or other supply source (not shown) pass around rolls 37 and then separate, with strip 10 being wrapped one or more times around drum 15 and roll 16 and strip 11 being wrapped one or more times around drum 18 and roll 21. Strip 10 passes from roll 16 around sheave 28 and then to sheaves 39 where it joins strip 11 from roll 21 and passes to storage apparatus 61.

To insure that the storage apparatus 61 receives equal lengths of srips 10 and 11 for wrapping around sheaves 63 and 65 and to avoid slack in either the strips, the apparatus of the invention detects changes in the length of strip 10 with respect to strip 11. Since cylinder 30 biases block 25 and sheave 28 mounted thereon in an upward direction, any increase in length or slack in strip 10 will cause sheave 28 and block 25 on which it is mounted to move upwardly causing a rotation of spur gear 34 as it is moved upward along guide-rack 35. This rotation of gear 34 rotates potentiometer 32 changing the electrical voltage supplied to motor 48 and increasing the speed at which it drives the exterior case of planetary differential 46 through belt 49. This increase in the speed of motor 48 causes an increase in the speed of the output shaft 51 of the planetary differential and thereby increases the speed of drum 18 operatively connected thereto through belt 52, speed reducer 53 and shaft 19 so that the length of strip 11 will match that of strip 10.

Conversely, if the length of strip 10 decreases with respect to strip 11, sheave 28 will be drawn downward, rotating gear 34 in the opposite direction as it moves downward with respect to guide-rack 35. This will rotate potentiometer 32, changing the electrical voltage supplied to motor 48 through appropriate control equipment (not shown) and increase the speed thereof and thereby decrease the speed of drum 18 to decrease the length of strip 11 to match that of strip 10.

The above description and drawings show that the present invention provides a novel apparatus for controlling the delivery of cords or strips. Furthermore, the apparatus of the invention provides for the coordination of the delivery of equal lengths of strips even at high delivery rates.

It will be apparent that modifications and variations in the apparatus described in detail and shown in the drawings may be made within the scope of the invention. For example, in place of the potentiometers, mechanical, pneumatic, hydraulic or other position-detecting devices which control speed in response to changes in position may be employed. In addition, the rolls may be driven by independent motors. Also, the arrangement of the various elements may be changed to accommodate the transfer of different structures or to meet space limitations. Therefore, the invention is to be limited only by the following claims.

That which is claimed is:

1. Apparatus for coordinating the transfer of a first cord and a second cord comprising:
    a frame;
    a first roll means, mounted on said frame, over which said first cord may be passed;
    a second roll means, mounted on said frame, over which said second cord may be passed;
    a first drive means, mounted on said frame, for driving said first roll means;
    a second drive means, mounted on said frame, for driving said second roll means; and
    control means, operably associated with said second roll means, for varying the speed of said second roll means in response to variations in the tension of said first cord.

2. The apparatus of claim 1 wherein said control means includes:
    a sheave biased against the tension of said first cord by a cylinder and a piston means; and
    a rack and pinion arrangement to vary the speed of said second drive means in response to variations in the position of said sheave.

3. The apparatus of claim 1 wherein said control means comprises:
    a slide rod mounted on said frame;
    a block slidably mounted on said slide rod and biased in one direction along said slide rod;
    a sheave rotatably mounted on said block over which said first cord passes;
    a potentiometer mounted on said block and connected to said second drive means, said potentiometer having a shaft;
    a spur gear mounted on said shaft; and
    a guide rack mounted on said frame substantially parallel to said slide rod and engaging said spur gear.

* * * * *